(12) United States Patent
Policandriotes

(10) Patent No.: US 11,742,731 B2
(45) Date of Patent: Aug. 29, 2023

(54) METHOD OF FORMING MAGNETIC FLUX OPTIMIZATION FOR UNIQUELY SHAPED DESIGNS

(71) Applicant: Hamilton Sundstrand Corporation, Charlotte, NC (US)

(72) Inventor: Tod Policandriotes, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/474,661

(22) Filed: Sep. 14, 2021

(65) Prior Publication Data

US 2023/0083543 A1 Mar. 16, 2023

(51) Int. Cl.
*H02K 15/03* (2006.01)
*H02K 1/02* (2006.01)
*H02K 15/12* (2006.01)

(52) U.S. Cl.
CPC .............. *H02K 15/03* (2013.01); *H02K 1/02* (2013.01); *H02K 15/12* (2013.01); *Y10T 29/49803* (2015.01)

(58) Field of Classification Search
CPC ............ H02K 1/02; H02K 5/02; H02K 15/03; H02K 15/12; H01F 1/08; H01F 1/0576; H01F 1/22; H01F 1/0536; H01F 41/0266; H01F 1/086; H01F 1/0577; C22C 2202/02
USPC ............... 29/419.2, 596, 598, 604, 607, 732
See application file for complete search history.

(56) References Cited

U.S. PATENT DOCUMENTS

| | | |
|---|---|---|
| 5,984,056 A | 11/1999 | Agnihotri et al. |
| 7,576,466 B2 | 8/2009 | Makita et al. |
| 10,663,020 B2 | 5/2020 | Jarzomski et al. |
| 2010/0256791 A1* | 10/2010 | Spicer ................ G05B 19/4097 700/98 |
| 2013/0313922 A1 | 11/2013 | Kim |
| 2014/0376837 A1 | 12/2014 | Sun et al. |
| 2017/0126087 A1* | 5/2017 | Soderberg ................ H02K 5/02 |

FOREIGN PATENT DOCUMENTS

| | | |
|---|---|---|
| CN | 110229469 | 9/2019 |
| EP | 3474297 A1 | 4/2019 |

OTHER PUBLICATIONS

European Search Report issued in European Patent Application No. 22195392.0; Application Filing Date Sep. 13, 2022; dated Feb. 1, 2023 (10 pages).

* cited by examiner

*Primary Examiner* — Thiem D Phan
(74) *Attorney, Agent, or Firm* — Cantor Colburn LLP

(57) ABSTRACT

A method of forming magnetically permeable material is provided. The method includes introducing magnetorheological (MR) fluid including one or more of magnetically permeable particles, fibers and fillers suspended in a curable liquid into a cavity, driving the magnetically permeable particles, fibers and/or fillers in the MR fluid into flux line formations and curing the curable liquid of the MR fluid during the driving to lock the flux line formations in place.

8 Claims, 3 Drawing Sheets

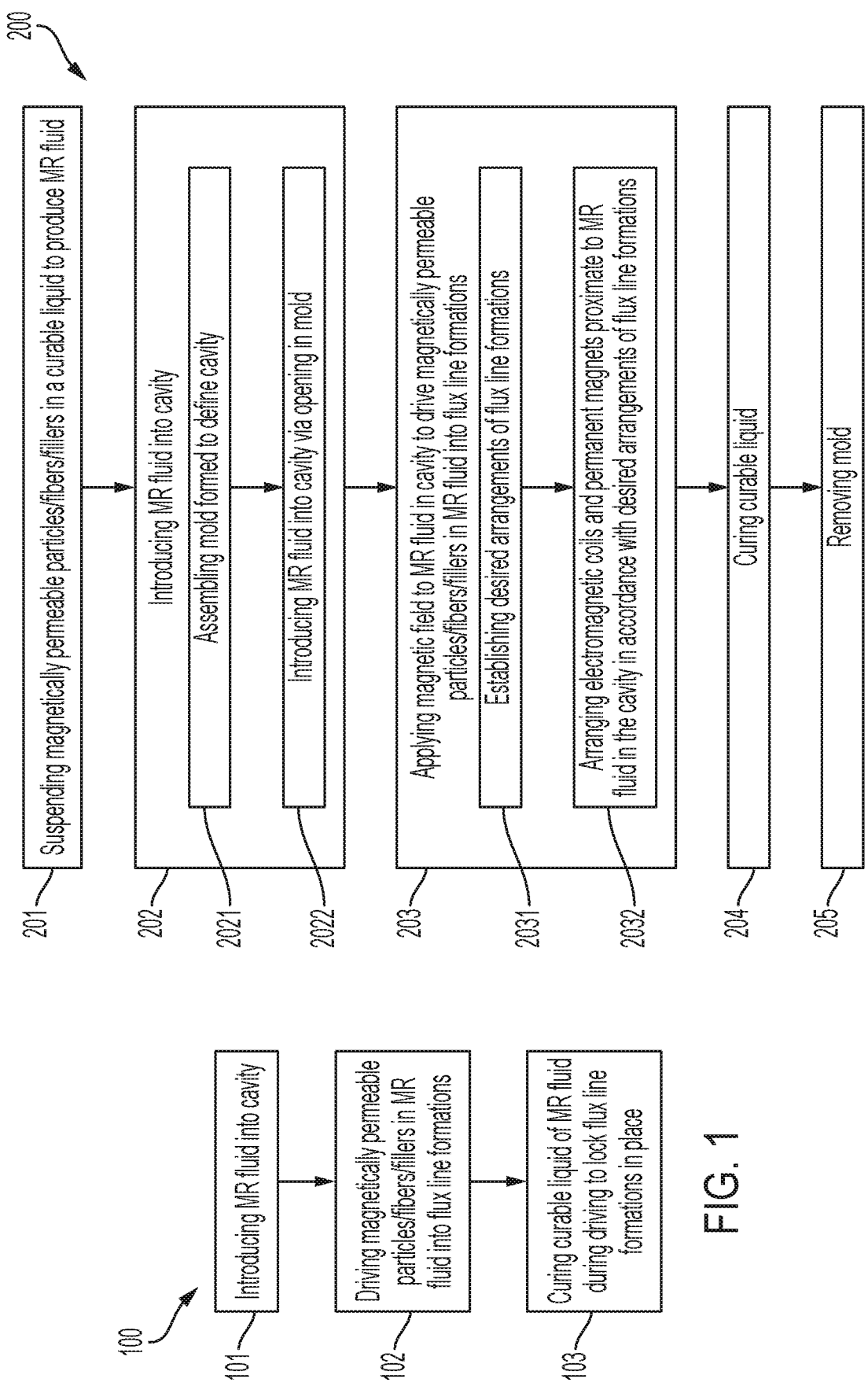

METHOD OF FORMING MAGNETIC FLUX OPTIMIZATION FOR UNIQUELY SHAPED DESIGNS

BACKGROUND

The present disclosure relates to optimal flux path creation with magnetorheological (MR) fluids and, more particularly, to optimal flux path creation with MR fluids for forming uniquely shaped features, such as stators for electric motors, so that solid metal alloys are not needed.

In electric motors and other devices that make use of magnetic material, magnetic materials are often required for completing magnetic circuits. Typically, these magnetic materials take the form of a solid metal alloy using either a bulk material or laminar sheets to orient and optimize magnetic flux from one location to another location. While these magnetic materials provide benefits in terms of orienting and optimizing magnetic flux, it is often the case that they cannot be easily or reliably formed into complex shapes.

BRIEF DESCRIPTION

According to an aspect of the disclosure, a method of forming magnetically permeable material is provided. The method includes introducing magnetorheological (MR) fluid including one or more of magnetically permeable particles, fibers and fillers suspended in a curable liquid into a cavity, driving the magnetically permeable particles, fibers and/or fillers in the MR fluid into flux line formations and curing the curable liquid of the MR fluid during the driving to lock the flux line formations in place.

In accordance with additional or alternative embodiments, the one or more magnetically permeable particles, fibers and fillers include one or more of cobalt powder particles, fibers and/or fillers, iron-cobalt alloy powder particles, fibers and/or fillers and iron powder particles, fibers and/or fillers.

In accordance with additional or alternative embodiments, the curable liquid includes one or more of resin and epoxy.

In accordance with additional or alternative embodiments, the curing includes one or more of heating and irradiating.

In accordance with additional or alternative embodiments, the cavity has a shape of a stator of an electric motor.

In accordance with additional or alternative embodiments, the introducing includes assembling a mold defining the cavity and introducing the MR fluid into the cavity via an opening in the mold.

In accordance with additional or alternative embodiments, the driving of the one or more magnetically permeable particles, fibers and fillers in the MR fluid into the flux line formations includes at least one of activating electromagnetic coils proximate to the MR fluid in the cavity and positioning permanent magnets proximate to the MR fluid in the cavity.

In accordance with additional or alternative embodiments, the method further includes establishing desired arrangements of the flux line formations and arranging at least one of the electromagnetic coils and the permanent magnets proximate to the MR fluid in the cavity in accordance with the desired arrangements of the flux line formations.

According to an aspect of the disclosure, a method of forming magnetically permeable material is provided. The method includes suspending one or more magnetically permeable particles, fibers and fillers in a curable liquid to produce a magnetorheological (MR) fluid, introducing the MR fluid into a cavity, applying a magnetic field to the MR fluid in the cavity to drive the one or more magnetically permeable particles, fibers and fillers in the MR fluid into flux line formations and curing the curable liquid of the MR fluid while the applying of the magnetic field to the MR fluid in the cavity continues to lock the flux line formations in place.

In accordance with additional or alternative embodiments, the one or more magnetically permeable particles, fibers and fillers include one or more of cobalt powder particles, fibers and/or fillers, iron-cobalt alloy powder particles, fibers and/or fillers and iron powder particles, fibers and/or fillers.

In accordance with additional or alternative embodiments, the curable liquid includes one or more of resin and epoxy.

In accordance with additional or alternative embodiments, the curing includes one or more of heating and irradiating.

In accordance with additional or alternative embodiments, the cavity has a shape of a stator of an electric motor.

In accordance with additional or alternative embodiments, the introducing includes assembling a mold defining the cavity and introducing the MR fluid into the cavity via an opening in the mold.

In accordance with additional or alternative embodiments, the applying of the magnetic field to the MR fluid in the cavity includes at least one of activating electromagnetic coils proximate to the MR fluid in the cavity and positioning permanent magnets proximate to the MR fluid in the cavity.

In accordance with additional or alternative embodiments, the method further includes establishing desired arrangements of the flux line formations and arranging at least one of the electromagnetic coils and the permanent magnets proximate to the MR fluid in the cavity in accordance with the desired arrangements of the flux line formations.

According to an aspect of the disclosure, a magnetically permeable material component is provided. The magnetically permeable material component includes a cured liquid and one or more magnetically permeable particles, fibers and fillers formed into flux line formations locked in place by the cured liquid.

In accordance with additional or alternative embodiments, the cured liquid includes at least one of a cured resin and a cured epoxy and the one or more magnetically permeable particles, fibers and fillers include one or more of cobalt powder particles, fibers and/or fillers, iron-cobalt alloy powder particles, fibers and/or fillers and iron powder particles, fibers and/or fillers.

In accordance with additional or alternative embodiments, an electric motor is provided and includes a rotor, a stator provided as the magnetically permeable material component and windings wound on teeth of the stator. The windings are configured to generate flux to drive rotations of the rotor when current is applied thereto.

In accordance with additional or alternative embodiments, an enclosure is provided for forming the magnetically permeable material component. The enclosure includes a mold defining a cavity, a conveyance configured to introduce a magnetorheological (MR) fluid including the one or more magnetically permeable particles, fibers and fillers suspended in a curable liquid into the cavity, electromagnetic elements configured to apply a magnetic field to the MR fluid in the cavity to drive the one or more magnetically permeable particles, fibers and fillers in the MR fluid into the flux line formations and curing elements to cure the curable liquid of the MR fluid into the cured liquid.

Additional features and advantages are realized through the techniques of the present disclosure. Other embodiments and aspects of the disclosure are described in detail herein and are considered a part of the claimed technical concept.

For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 1 is a flow diagram illustrating a method of forming magnetically permeable material in accordance with embodiments;

FIG. 2 is a flow diagram illustrating a method of forming magnetically permeable material in accordance with further embodiments;

DETAILED DESCRIPTION

As will be described below, magnetorheological (MR) fluids are used to create optimal magnetic flux paths for applications, such as uniquely shaped stators for electric motors, without using solid metal alloys. The MR fluid is produced by the magnetic permeable powders, such as cobalt powder, iron-cobalt alloy powder, iron powder or any other highly magnetic permeable powder including fibers and fillers for reducing weight of components, being provided in a curable liquid, such as a resin or another viscous liquid to be determined based on the application. The MR fluid can then be inserted or injected into a cavity of any shape or size (i.e., a cavity in the shape of a stator). Using electromagnetic coils and super magnets, flux lines formed of particles, fibers and/or fillers of the magnetic permeable powder are created in the MR fluid. These flux lines are then effectively frozen in place by the liquid being cured or otherwise hardened into a solid.

With reference to FIG. 1, a method 100 of forming magnetically permeable material is provided. The method 1000 includes introducing magnetorheological (MR) fluid into a cavity of any shape or size (101), where the MR fluid includes magnetically permeable particles, magnetically permeable fibers and/or magnetically permeable fillers suspended in a curable liquid. The method 100 further includes driving the magnetically permeable particles, the magnetically permeable fibers and/or the magnetically permeable fillers in the MR fluid into flux line formations (102) and curing the curable liquid of the MR fluid during the driving to lock the flux line formations in place (103).

Figure 3:
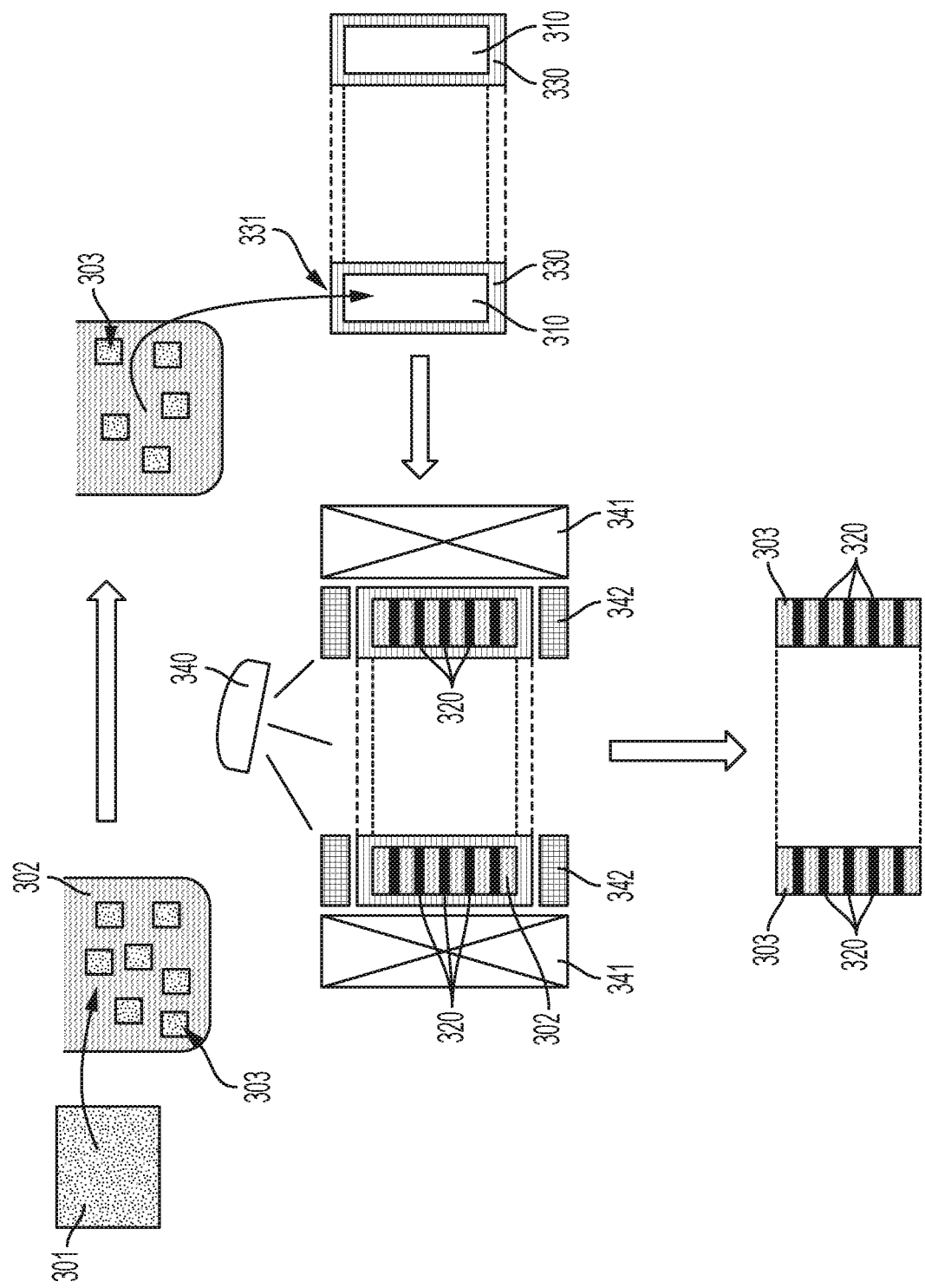
FIG. 3 is a graphical illustration of the methods of FIGS. 1 and 2 in accordance with embodiments.

With reference to FIGS. 2 and 3, a method 200 of forming magnetically permeable material is provided. The method 200 includes suspending magnetically permeable particles, magnetically permeable fibers and/or magnetically permeable fillers (hereinafter referred to as "magnetically permeable particles, fibers and/or fillers") 301 in a curable liquid 302 to produce a magnetorheological (MR) fluid 303 (201). The magnetically permeable particles, fibers and/or fillers 301 can include one or more of cobalt powder particles, fibers and/or fillers, iron-cobalt alloy powder particles, fibers and/or fillers, iron powder particles, fibers and/or fillers and other similar types of powders, particles, fibers and/or fillers. The curable liquid 302 can include one or more of resin and epoxy and can be cured by application of heat, radiation (e.g., ultraviolet (UV) radiation) or other similar external stimuli. The method 200 further includes introducing the MR fluid 303 into a cavity 310 of any shape or size (202), applying a magnetic field to the MR fluid 303 in the cavity 310 to drive the magnetically permeable particles, fibers and/or fillers 301 in the MR fluid 303 into flux line formations 320 (203). The method 200 also includes curing the curable liquid 302 of the MR fluid 303 while the applying of the magnetic field to the MR fluid 303 in the cavity 310 continues to thereby lock the flux line formations 320 in place (204) and optionally removing the mold 330 (see below) from the MR fluid 303 with the curable liquid 302 in a cured condition (205). The curing of operation 204 can be executed by use of curing elements 340, such as a heat element or a UV light.

In accordance with embodiments, the cavity 310 can have any shape or size including, for example, a shape of a stator of an electric motor as discussed in further detail below.

As shown in FIGS. 2 and 3, the introducing of operation 202 can include assembling a mold 330 which is formed to define the cavity 310 (2021) and introducing the MR fluid 303 into the cavity 310 via an opening 331 in the mold 330 (2022). Also, the applying of the magnetic field to the MR fluid 303 in the cavity 310 of operation 203 can include at least one of activating electromagnetic coils 341, which are disposed proximate to the MR fluid 303 in the cavity 310, and positioning permanent magnets 342, which are disposed proximate to the MR fluid 303 in the cavity 310. In either case, the method can optionally include establishing desired arrangements of the flux line formations 320 (2031) and arranging at least one of the electromagnetic coils 341 and the permanent magnets 342 proximate to the MR fluid 303 in the cavity 310 in accordance with the desired arrangements of the flux line formations 320 (2032). In other words, the placements of the at least one of the electromagnetic coils 341 and the permanent magnets 342 are such that the flux line formations 320 being formed are formed in a desired configuration. This desired configuration can, for example, be intended to promote optimized flux line generation in and through a stator during an operation of an electric motor including the stator.

Figures 4, 5:
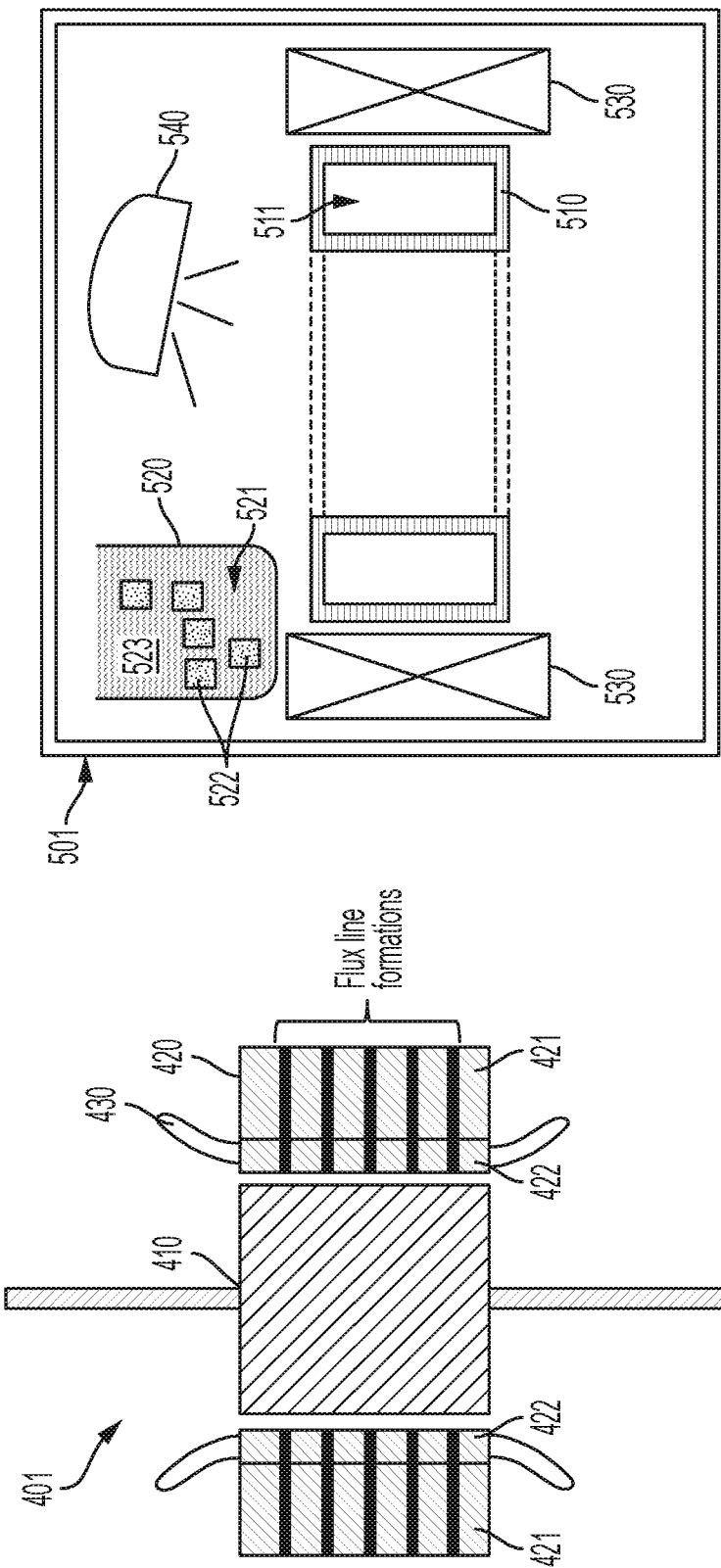
FIG. 4 is a schematic illustration of an electric motor including a stator or component that is formed of magnetically permeable material in accordance with embodiments.
FIG. 5 is a schematic illustration of an enclosure for forming the stator or component formed of the magnetically permeable material of FIG. 4 in accordance with embodiments.

With reference to FIG. 4, an electric motor 401 is provided and includes a rotor 410, which is rotatable about a rotational axis thereof, a stator 420 and windings 430. The stator 420 includes an annular body 421 and teeth 422 extending radially from the annular body 421. The windings 430 are wound on the teeth 422 and are configured to generate flux to drive rotations of the rotor 410 when current is applied to the windings 430. At least a portion of the stator 420 can be provided as a magnetically permeable material component that includes a cured liquid as in the curable liquid described above with reference to FIGS. 2 and 3 and the magnetically permeable particles, fibers and/or fillers formed into the flux line formations that are locked in place by the cured liquid as described above with reference to FIGS. 2 and 3. Again, as above, the cured liquid can include at least one of a cured resin and a cured epoxy and the magnetically permeable particles, fibers and/or fillers include one or more of cobalt powder particles, fibers and/or fillers, iron-cobalt alloy powder particles, fibers and/or fillers, iron powder particles, fibers and/or fillers and other similar types of powders, particles, fibers and/or fillers.

With reference to FIG. 5, an enclosure 501 for forming the magnetically permeable material component (e.g., the stator 420 of FIG. 4) is provided. The enclosure 501 includes a mold 510 that is formed to define a cavity 511 of any shape or size, a conveyance 520 that is configured to introduce an MR fluid 521 into the cavity 511, electromagnetic elements 530 and curing elements 540. As described above, the MR fluid 521 can include magnetically permeable particles, fibers and/or fillers 522 suspended in a curable liquid 523. The electromagnetic elements 530 can include one or more of electromagnetic coils and permanent magnets, for example, and are configured to apply a magnetic field to the MR fluid 521 in the cavity 511 to drive the magnetically permeable particles, fibers and/or fillers 522 into flux line formations. The curing elements 540 can include one or more of heat lamps, furnaces or UV lights, for example, to cure the curable liquid 523 into a cured liquid to lock the flux line formations in place.

Technical effects and benefits of the present disclosure are the provision of new out-of-the-box motor designs with high efficiency and the ease of cooling to eliminate Eddy current heating. The use of MR fluids in the present disclosure opens the door to unique designs which could not be created previously due to limitations of solid metal laminate sheets or any solid metal alloys. It also allows for the optimization of magnetic flux lines/planes in any shape to complete magnetic circuits.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A method of forming magnetically permeable material, the method comprising:
   suspending one or more magnetically permeable particles, fibers and fillers in a curable liquid to produce a magnetorheological (MR) fluid;
   introducing the MR fluid into a cavity;
   applying a magnetic field to the MR fluid in the cavity to drive the one or more magnetically permeable particles, fibers and fillers in the MR fluid into flux line formations; and
   curing the curable liquid of the MR fluid while the applying of the magnetic field to the MR fluid in the cavity continues to lock the flux line formations in place.

2. The method according to claim 1, wherein the one or more magnetically permeable particles, fibers and fillers comprise one or more of cobalt powder particles, fibers and/or fillers, iron-cobalt alloy powder particles, fibers and/or fillers and iron powder particles, fibers and/or fillers.

3. The method according to claim 1, wherein the curable liquid comprises one or more of resin and epoxy.

4. The method according to claim 1, wherein the curing comprises one or more of heating and irradiating.

5. The method according to claim 1, wherein the cavity has a shape of a stator of an electric motor.

6. The method according to claim 1, wherein the introducing comprises:
   assembling a mold defining the cavity; and
   introducing the MR fluid into the cavity via an opening in the mold.

7. The method according to claim 1, wherein the applying of the magnetic field to the MR fluid in the cavity comprises at least one of:
   activating electromagnetic coils proximate to the MR fluid in the cavity; and
   positioning permanent magnets proximate to the MR fluid in the cavity.

8. The method according to claim 7, further comprising:
   establishing desired arrangements of the flux line formations; and
   arranging at least one of the electromagnetic coils and the permanent magnets proximate to the MR fluid in the cavity in accordance with the desired arrangements of the flux line formations.

\* \* \* \* \*